United States Patent [19]

Netravali et al.

[11] Patent Number: 5,680,552
[45] Date of Patent: Oct. 21, 1997

[54] GATEWAY SYSTEM FOR INTERCONNECTING DIFFERENT DATA COMMUNICATION NETWORKS

[75] Inventors: Arun Narayan Netravali; Krishan Kumar Sabnani, both of Westfield, N.J.

[73] Assignee: Lucent Technologies Inc., Murray Hill, N.J.

[21] Appl. No.: 309,213

[22] Filed: Sep. 20, 1994

[51] Int. Cl.$^6$ .................................................. G06F 13/00
[52] U.S. Cl. .................... 395/200.2; 370/85.13; 379/220
[58] Field of Search ............... 395/200.01, 200.02, 395/200.06, 200.1, 200.2, 500, 182.02, 182.13, 200.12; 370/60, 62, 65, 53, 112, 54, 85.13, 85.14, 85.9, 94.1, 94.3; 379/14, 219, 220

[56] References Cited

U.S. PATENT DOCUMENTS

| 5,214,646 | 5/1993 | Yacoby | 370/85.14 |
| 5,301,303 | 4/1994 | Abraham et al. | 395/500 |
| 5,327,544 | 7/1994 | Lee et al. | |
| 5,455,700 | 10/1995 | Thompson et al. | 359/135 |
| 5,457,683 | 10/1995 | Robins | 370/60 |
| 5,481,540 | 1/1996 | Huang | 370/85.13 |
| 5,485,455 | 1/1996 | Dobbins et al. | 370/60 |
| 5,555,244 | 9/1996 | Gupta et al. | 370/60.1 |

OTHER PUBLICATIONS

Bochmann, G.V., "Deriving Protocol Converters for Communications Gateways," IEEE Transactions on Communications, vol. 38, No. 9, Sep. 1990, pp. 1298–1300.

Auerbach, J., "A Protocol Conversion Software Toolkit," Proc. ACM Sigcomm '89, Austin, Texas, Sep. 1989, pp. 259–270.

Bochmann, G.V., and Mondain-Monval, P., "Design Principles for Communication Gateways," IEEE J. on Selected Areas in Communications, vol. 8, 1990, pp. 12–21.

Calvert, K.L., and Lam, S.S., "Deriving a Protocol Converter: A Top–down Approach," Proc. ACM Sigcomm '89, Austin, Texas, Sep. 1989, pp. 247–258.

Even, S., and Shiloach, "An On–line Edge Deletion Problem," J. Assoc. Comput. Mach., vol. 28, 1981, pp. 1–4.

Frederickson, G.N., "Data Structures for On–line Updating of Minimum Spanning Trees with Applications," Siam J. Comput., vol. 14, 1985, pp. 781–798.

Green, P.E., "Protocol Conversion," IEEE Trans. Comm., vol. COM–34, No. 3, Mar. 1986, pp. 257–268.

Hoare, C.A.R., "Communicating Sequential Processes," Communications of the ACM, vol. 21, No. 8, Aug. 1978, pp. 666–677.

Kanellakis, P.C., and Smolka, S.A., "CCS Expressions, Finite States Processes and Three Problems of Equivalence," Information and Computation, vol. 86, 1990, pp. 43–68.

Kristol, D.M., et al., "A Polynomial Algorithm for Gateway Generation from Formal Specifications," IEEE/ACM Transactions On Networking, vol. 1, No. 2, Apr. 1993, pp. 217–229.

(List continued on next page.)

Primary Examiner—Alpesh M. Shah

[57] ABSTRACT

A gateway system for connecting first and second communication networks has first and second network end nodes and a protocol converter. The gateway system operates to provide input-output services of both network protocols to users of both networks in communicating through the gateway system. The gateway system employs associated complement protocol circuits in the end nodes and the protocol converter to provide these services. An efficient technique for generating the complement protocol of a first network is to prune finite state machines representing the operation of the second network protocol to provide the services of the second protocol that are not provided by the first protocol. The complement protocol circuits for the second network are then constructed based on the pruned finite state machines representing the operation of the first protocol.

12 Claims, 13 Drawing Sheets

OTHER PUBLICATIONS

Kristol, D.M., et al., "Efficient Gateway Synthesis from Formal Specifications," Proc. Sigcomm '91.

Lam, S., "Protocol Conversion," IEEE Trans. Soft. Engr., vol. 14, No. 3, Mar. 1988, pp. 353–363, (an earlier version was presented at Sigcomm '86).

Lam, S., and Shankar, A.U., "Protocol Verification via Projections," IEEE Trans. on Software Engineering, vol. SE–10, No. 4, Jul. 1984, pp. 325–343.

Lee, D., et al., "Conformance Testing of Protocols Specified as Communicating Finite State Machines," Proc. Infocom '93.

Merlin, P.M., and Bochmann, G.V., "On the Construction of Submodule Specifications and Communication Protocols," ACM Trans. Prog. Lang. and Sys., vol. 5, No. 1, Jan. 1993.

Okumura, K., "A Formal Protocol Conversion Method," Proc. ACM Sigcomm '86, Stowe, Vermont, Aug. 5–7, 1986, pp. 30–37.

Pehrson, B. "Protocol Verification for OSI," Computer Networks and ISDN Systems, vol. 18, No. 3, Apr. 1990, pp. 185–202.

Paige, R., and Tarjan, R.E., "Three Partition Refinement Algorithms," Siam J. Comput., vol. 16, No. 6, Dec. 1987, pp. 973–989.

Sabnani, K., "An Algorithmic Technique for Protocol Verification," IEEE Trans. Comm., vol. COM–36, No. 8, Aug. 1988, pp. 924–931.

West, C.H., "An Automated Technique of Communication Protocol Validation," IEEE Trans. Comm., vol. COM–26, No. 8, Aug. 1978, pp. 1271–1275.

Tao, Y.W., et al., "A Modular Approach to Constructing Protocol Converters," Proc. Infocom '90, Jun. 1990, pp. 572–579.

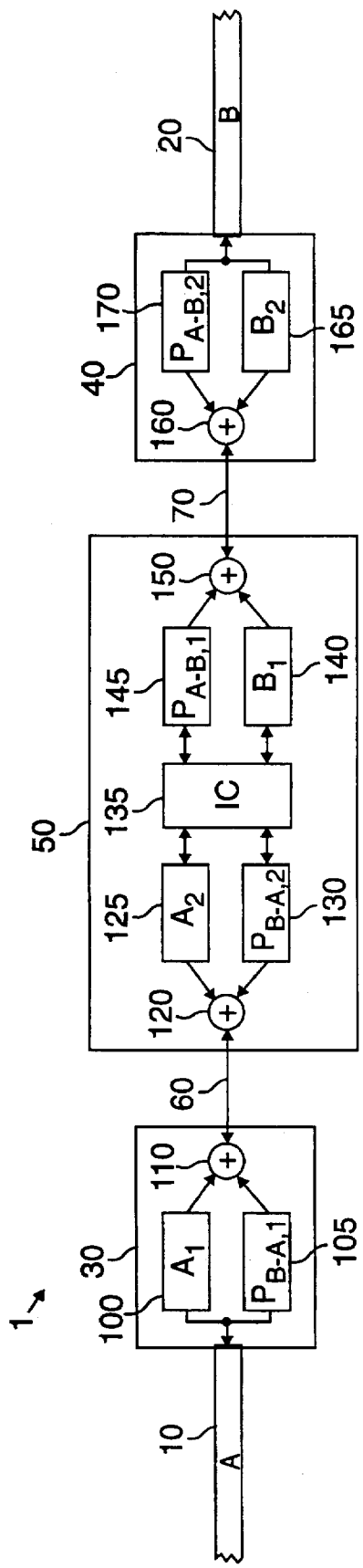
FIG. 2
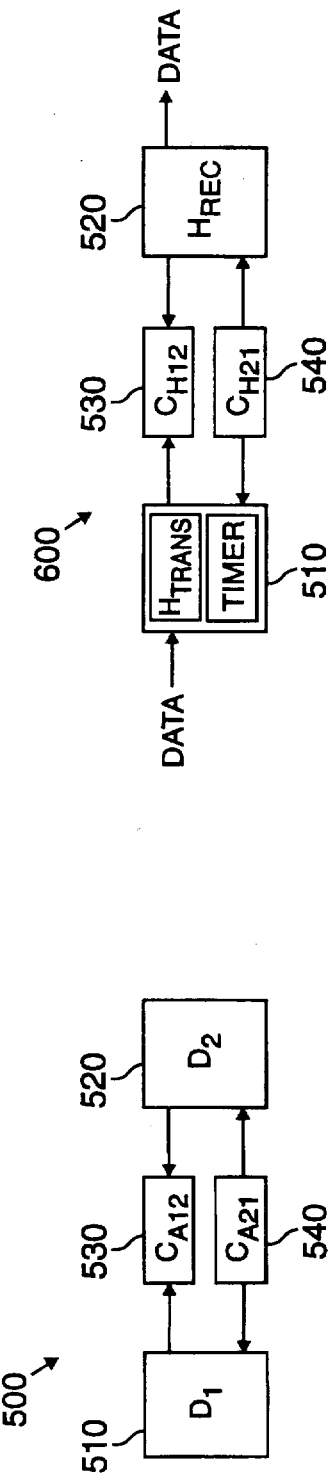
FIG. 12
FIG. 5

GATEWAY SYSTEM FOR INTERCONNECTING DIFFERENT DATA COMMUNICATION NETWORKS

FIELD OF THE INVENTION

This invention relates to gateways between computer networks, and more particularly to the synthesis of a gateway system that permits users of the associated networks to transmit and receive information through the gateway system using services available on either network.

BACKGROUND OF THE INVENTION

Computer networks and other data communication networks that employ communication protocols, such as Systems Network Architecture (SNA), DECNET, and Open Systems Architecture (OSI), are currently utilized around the world. A network protocol is a well defined set of rules governing the syntax, semantics and timing of the data transmission on the network. With the widespread use of electronic mail and file transfer services, it has become increasingly important to provide interconnections between networks. Three commonly used types of network interconnections are bridges, routers and gateways.

Conventional network interconnection systems typically have been built using ad hoc techniques. Problems in automatically synthesizing interconnections include overcoming network architectural mismatches and designing the protocol converters between the networks. Architectural mismatches involve differences in network layer functionalities, bit rates, buffering, interfaces and hand-off procedures. Since considerable judgment, trade-off, analysis, and decision making is required to overcome architectural mismatches, automatic generation of systems to overcome the architectural mismatches is not foreseeable in the near future.

Protocol converters translate messages from one protocol to another to rectify any mismatches between network protocols. Recently, techniques have been developed that automatically generate a protocol converter from formal specifications of the corresponding network protocols. Known automatic generation techniques include those described in S. Lam, "Protocol Conversion," *IEEE Trans. Soft. Engr.*, Vol. 14, No. 3, pp. 353–362, March 1988 (an earlier version was presented at SIGCOMM '86); and Y. W. Yao, W. S. Chen, and M. T. Liu, "A Modular approach to constructing Protocol Converters," *Proc. INFOCOM '90*, pp. 572–579, June 1990.

Automatic generation of protocol converters based on formal specifications has the following advantages: (1) the operation of the protocol conversion can be proved correct; (2) the protocol converter can be constructed in a relatively short period of time; and (3) the protocol converter can be changed quickly to adapt to changes in the protocol specification. However, most currently existing automatic synthesis techniques are relatively complex and inefficient due to a lack of effective procedures that can handle large realistic protocols, as well as due to the difficulty in preparing the formal specifications of the protocols.

However, an example of an efficient automatic synthesis technique is described in D. M. Kristol, D. Lee, A. N. Netravali, and K. Sabnani, "A Polynomial time Algorithm for computing Protocol Converters from Formal Specifications," *IEEE/ACM Transactions on Networking*, pp. 217–229, April 1993, and in U.S. Pat. No. 5,327,544, which is assigned to the assignee of the present invention. Both of these references are hereby incorporated by reference. The automatic synthesis technique described in these references generates a protocol converter that provides the greatest common subset of services available on the associated network protocols. This common subset of services is available to users that transmit and receive information through the protocol converter. Typical network services include data transfer, database inquiries and file transfers.

However, this technique is not transparent to users on either network because all the services available to the users on that network may not be part of the implemented subset in the protocol converter, and thereby not useable when communicating through the protocol converter. Therefore, a need exists for a method of automatically generating a gateway system having a protocol converter that provides a super-set of services to network users that transmit and receive information through the gateway system.

SUMMARY OF THE INVENTION

A gateway system for connecting first and second communication networks according to one embodiment of the invention may include first and second network-end nodes and a protocol converter. Such a gateway system employs associated complement protocol circuits in the end nodes and the protocol converter to provide those services of one protocol that are not provided by the protocol of the corresponding network attached to that end node. As a consequence, the gateway system provides a super-set of services of both network protocols to users of both networks in communicating through the gateway system.

A method for generating a gateway system between first and second networks according to an embodiment of the invention first determines a common subset of services equal to an intersection of services provided by the protocols. Finite state machines ("FSM") are then generated which characterize first and second complement protocols of those services provided by the network protocols. The first complement service FSM contains those services provided by the second network protocol that are not provided by the first network protocol. Likewise, the second complement service protocol contains those services provided by the first network protocol and not the second network protocol.

Sets of intercommunicating finite state machines representing each network protocol are then pruned to provide first and second complement network protocol finite state machines. The end nodes and protocol converter are then constructed using circuits that perform the operations of the sets of protocol finite state machines for the protocols, and the first and second complement network protocol finite state machines, as well as an interface converter. The method for generating the gateway system is simple, efficient, and can be accomplished in a polynomial-based number of steps.

The above-discussed features, as well as additional features and advantages of the present invention, will become more readily apparent by reference to the following detailed description and the accompanying drawings.

BRIEF DESCRIPTION OF THE DRAWINGS

FIG. 2 is a detailed schematic diagram of a protocol converter and associated network end nodes in the gateway system of FIG. 1;

FIG. 5 is a block diagram of a model arrangement of component finite state machines ("FSMs") to characterize a communication protocol that may be used in generating the gateway system of FIG. 1;

FIG. 12 is an arrangement of the FSMs for the HABP of FIGS. 6–11 according to the organization of FIG. 5;

DETAILED DESCRIPTION

Figure 1:
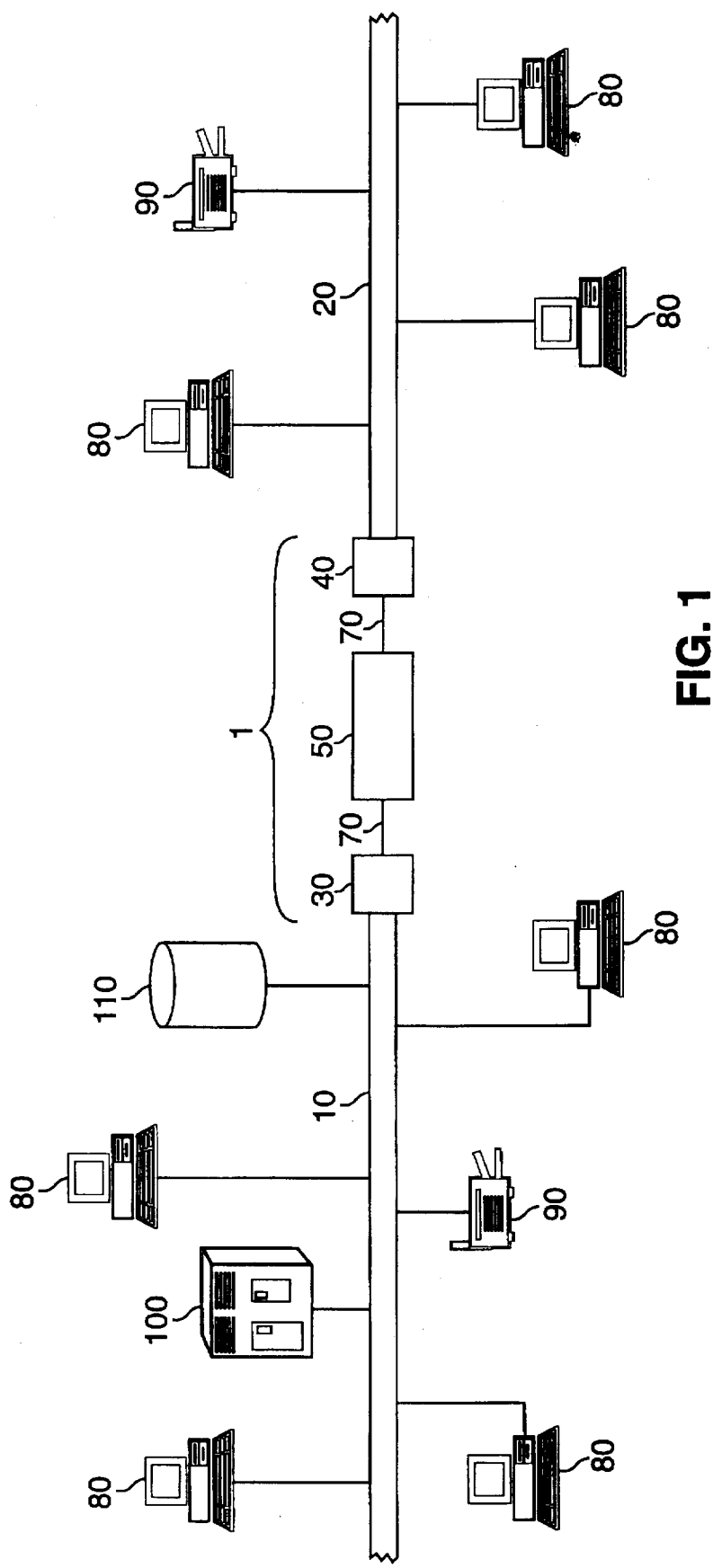
FIG. 1 is a schematic diagram of two data communication networks interconnected by a gateway system according to the present invention.

An embodiment of an interconnection of two networks by a gateway system 1 according to the present invention is shown in FIG. 1. In FIG. 1, first and second data communications networks 10 and 20 are connected to associated first and second network end nodes 30 and 40, respectively. The end nodes 30 and 40 are connected to a protocol converter 50 by first and second communications channels 60 and 70, respectively. The gateway system 1 consists of the end nodes 30 and 40, and the protocol converter 50.

Each one of the data communications networks 10 and 20 may be connected to respective computers 80, printers 90, file servers 100 and other data storage devices 110. Additional suitable data communication equipment may also be attached to the networks 10 and 20. In FIG. 1, the first data communications network 10 employs a protocol A and the second data communications network 20 employs a protocol B.

The operations of a network protocol may be modeled by a set of intercommunicating finite state machines (FSMs). Exemplary sets of FSMs characterizing half-duplex and full-duplex communication protocols are depicted in FIGS. 6–11 and 14–21, respectively, which are described in greater detail below. In the following description, interprocess input-output operation notation similar to that used in the language CSP is used to specify the intercommunication between protocol FSMs. CSP stands for Communicating Sequential Processes which is described in C. A. R. Hoare, "Communicating Sequential Processes," *Communications of the ACM*, Vol. 21, No. 8, pp. 666–677, August 1978 ("*Communicating Sequential Processes*").

According to this notation, a FSM sends a message to other FSMs by means of an "output operation" designated by the symbol "!". Where, for example, there are two FSMs, machine #1 and machine #2, an output operation in machine #1 which sends the message "msg" to machine #2 is denoted by machine2!msg. An FSM is also capable of receiving messages. For each message that is sent by one FSM there must be a receipt of the message by at least one other FSM. A FSM receives a message from another FSM by means of an "input operation" designated by the symbol "?". With respect to the output operation exemplified above, the corresponding input operation in machine #2 is denoted by machine1?msg, which means receive the message "msg" from machine #1.

The operations machine1?msg and machine2!msg are executed simultaneously because they represent different perspectives of the same event. Neither operation can be executed individually. Thus, if a first FSM attempts to do an output operation, it has to wait until a second FSM is ready to execute the corresponding input operation. The synchronized message exchange between two FSMs is called a rendezvous.

If the FSM name is not specified in an input or output operation, then the input-output operation can take place with any other FSM that is ready to execute the corresponding operation. For example, if a FSM has an operation ?msg, then the receipt of "msg" from any other FSM will trigger the operation of the FSM. These types of input-output operations are often used to model a protocol's interactions with multiple users on multiple communication channels.

A typical FSM for use in an embodiment of this invention is a four-tuple $F=(\Sigma, V, \rho, s_0)$ where the symbol $\Sigma$ is a set consisting of all the FSM's input-output operations and an internal operation; the symbol V is a finite set of states that the FSM may be in; the symbol $\rho$ is a finite set of state transition functions, such as machine!msg or machine?msg; and the symbol $s_0$ is the initial state of the FSM F. While doing an internal transition from one state to another state, a FSM makes a state transition without interacting with any other FSM. For more information regarding FSMs see Z. Kohavi, *Switching Theory and Finite Automata Theory*, McGraw-Hill, pp. 275–315 (1978) and *Communicating Sequential Processes*.

Figure 6:
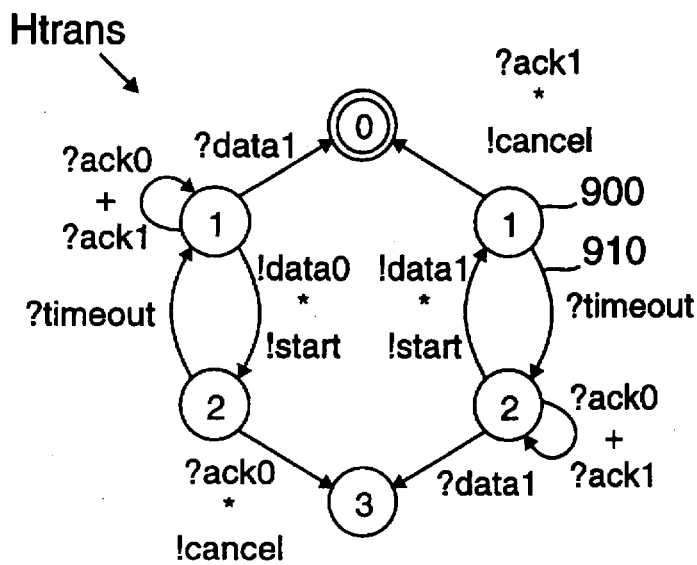
FIG. 6 is a transmitter FSM for use in a half-duplex alternating bit protocol (HABP) which may be implemented in one of the networks of FIG. 1.
Figure 8:
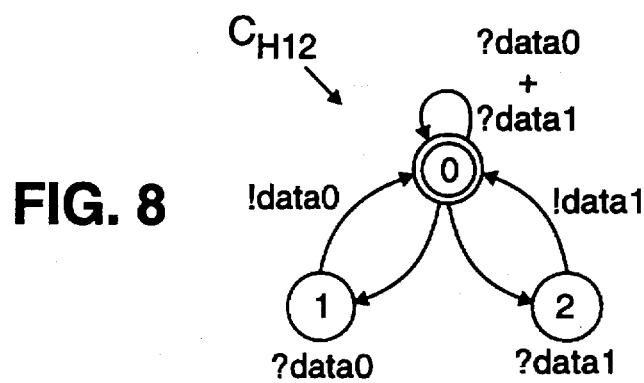
FIG. 8 is a FSM for a first communications channel in the HABP.
Figure 9:
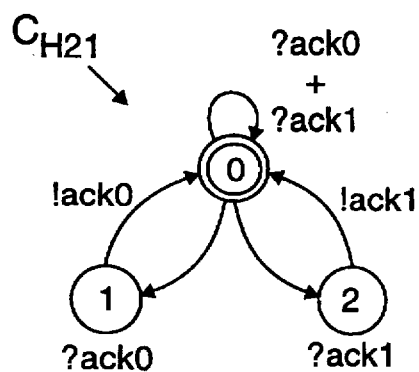
FIG. 9 is a FSM for a channel communications channel in the HABP.
Figure 10:
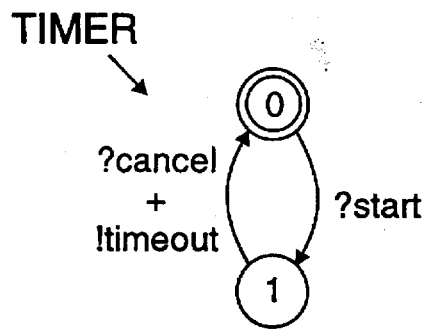
FIG. 10 is a FSM for a timer associated with the transmitter FSM of FIG. 6.

A FSM may be represented as a directed graph (V,E) where the symbol V is the set of states in the FSM and the symbol E is the set of edges or possible state transitions between states. Each state of a FSM is represented in a directed graph by a circle encircling the designation of the state, such as the state 900 in the state machine Htrans of FIG. 6. Each edge is labeled by an input-output operation, belonging to the set Σ, which either triggers the state transition or is a result of the state transition. For example, edge 910 extending from state 900 in FIG. 6 is labeled with ?timeout. Additionally, an edge may be labeled by two or more input-output operations which independently, or in conjunction, trigger the state transition, or are the result of it.

For notational purposes, an edge labeled by a*b denotes an edge triggered by an input-output operation a followed by an input-output operation b. The symbol "*" represents the boolean AND operator. Therefore, a state transition, represented by an edge labeled by ?ack0*?cancel is only triggered by the receipt of the messages "ack0" and "cancel". A state transition represented by an edge labeled by ?ack0*!start is triggered by the receipt of the message ack0 and the sending of the message start. An edge labeled by a+b denotes two edges that connect the same two states, one labeled by the input-output operation a and one labeled by the input-output operation b. The symbol "+" represents the boolean OR operator. For example, a state transition represented by an edge labeled ?ack1+?start is triggered by the receipt of either of the messages "ack1" or "start".

A FSM always starts in its initial state $s_0$. The initial state is labeled 0 and may be additionally designated in the directed graph representing the FSM by the presence of a concentric circle surrounding the 0. When the FSM is in any given state it can execute any of the operations that label a transition from that state.

A protocol provides one or more services to the user of the protocol. These services are also represented as a FSM called the service FSM. However, there is not necessarily a one-to-one mapping or correlation between the set of services provided by a protocol and the set of FSMs that can represent the protocol operation. The input-output operations of the protocol represented by the service FSM are called service primitives of the protocol. According to international standards, a service primitive means an abstract message exchange between the protocol and its user or upper layer. An example of a service primitive is !send (data) where the primitive send is used to transmit a message data.

If an edge in one FSM is labeled by an input-output operation that has no corresponding operation in another FSM, the transition can never occur. For example, if an edge in machine #1 is labeled machine2!msg, and machine #2 contains no edge labeled machine1?msg, the transition in machine1 can never occur. This characteristic of communicating FSMs is utilized in the method for generating a gateway system according to the present invention.

For any two FSMs $F_1$ and $F_2$, a FSM designated $F_1 \# F_2$ can be built that corresponds to the joint behavior of $F_1$ and $F_2$. The FSM $F_1 \# F_2$ is called a reachable FSM, or a composition of $F_1$ and $F_2$. The process of constructing $F_1 \# F_2$ from the components $F_1$ and $F_2$ is called the reachability computation, or composing, and is well known in the art. Finding the reachable FSM is done by computing the reachable global states. A global state for $F_1 \# F_2$ is defined as a two-tuple $(s_1, s_2)$, where $s_1$ is the current state of $F_1$ and $s_2$ is the current state of $F_2$. Computation of the reachable global states is described in G. v. Bochmann and C. A. Sunshine, "A Survey of Formal Methods," *Computer Networks and Protocols*, P. E. Green (Ed.), pp. 561–578, Plenium Press, May 1983.

A more detailed view of the gateway system 1 of FIG. 1 is shown in FIG. 2. In FIG. 2, the data communications network 10 is connected to a protocol circuit $A_1$ 100 and a complement protocol circuit $P_{B-A,1}$ 105 in the network end node 30. Within the network end node 30, the circuits $A_1$ 100 and $P_{B-A,1}$ 105 are connected to a first combined multiplexer-demultiplexer (MUX-DEMUX) 110.

The protocol circuit $A_1$ 100 performs the operations specified in a portion of the set of protocol FSMs that characterize the protocol A and is described in greater detail below. The complement protocol circuit $P_{B-A,1}$ 105 performs operations that are specified in a portion of a set of complement protocol FSMs characterizing a complement protocol $P_{B-A}$. The complement protocol $P_{B-A}$ provides those services of the protocol B implemented on the network 20 that are not provided by the protocol A of the network 10. The complement protocol circuit $P_{B-A,1}$ 105 and complement protocol $P_{B-A}$ are also described in greater detail below.

The MUX-DEMUX 110 is also connected to the first communications channel 60 which is connected to a second MUX-DEMUX 120 disposed in the protocol converter 50. Within the protocol converter 50, the MUX-DEMUX 120 is connected to an interface protocol circuit $A_2$ 125 and an interface complement protocol circuit $P_{B-A,2}$ 130. The interface protocol circuit $A_2$ 125 performs those operations characterized in the remainder portion, the set of FSMs for the protocol A that is not performed by the protocol circuit $A_1$ 100, and is described in greater detail below. Likewise, the interface complement protocol circuit $P_{B-A,2}$ 130 performs those operations characterized in the remainder portion of the set of FSMs for the complement protocol $P_{B-A}$ that are not performed by the complement protocol circuit $P_{B-A,1}$ 105. The interface complement protocol circuit $P_{B-A,2}$ 130 is also described in greater detail below. The MUX-DEMUXs 110 and 120 operate in conjunction with one another to multiplex and demultiplex signals on the communications channel 60 between the circuits $A_1$ 100 and $A_2$ 125, and between the circuits $P_{B-A,1}$ 105 and $P_{B-A,2}$ 130, respectively.

Within the gateway protocol converter 50, the circuits $A_2$ 125 and $P_{B-A,2}$ 130 are connected to an interface converter IC 135. The interface converter IC 135 is further connected to the interface protocol circuit $B_1$ 140 and an interface complement protocol circuit $P_{A-B,1}$ 145 which are described in greater detail below. The circuits $B_1$ 140 and $P_{A-B,1}$ 145 are connected to a third MUX-DEMUX 150 which is connected to the second communications channel 70.

The communications channel 70 is further connected to a fourth MUX-DEMUX 160 contained in the network end node 40. Within the network end node 40, the MUX-DEMUX 160 is connected to the protocol circuit $B_2$ 165 and a complement protocol circuit $P_{A-B,2}$ 170. The circuits $B_2$ and $P_{A-B,2}$ are also connected to the second data communications network 20.

The protocol circuit $A_1$ 100 and the interface protocol circuit $A_2$ 125 perform the communication functions of the protocol A as modeled by the corresponding set of FSMs.

The determination as to which FSM of the set of protocol FSMs is to be implemented in which of the circuits $A_1$ 100 or $A_2$ 125 would be readily apparent to those skilled in the art. Generally, the functions specified by the FSMs of the set that are used to communicate with the users and upper-level of the network are implemented in the circuit $A_1$ 100. Correspondingly, those functions characterized by the FSMs of the set that facilitate communication with other networks are implemented in the circuit $A_2$ 125. An example of the arrangement of the functions of the various FSMs in the respective protocol circuits is described below with respect to FIG. 29.

The interface protocol circuit $B_1$ 140 and the protocol circuit $B_2$ 165 operate according to the protocol B as specified in the corresponding set of FSMs in an analogous manner to that of the circuits $A_2$ 125 and $A_1$ 100, respectively. Likewise, the functions of the complement protocols $P_{B-A}$ and $P_{A-B}$, which are characterized by the respective sets of FSMs are divided between the circuits $P_{B-A,1}$ 105 and $P_{B-A,2}$ 130, and between the $P_{A-B,1}$ 145 and $P_{A-B,2}$ 170, respectively. In a similar manner to that stated above, the complement protocol $P_{A-B}$ characterizes the operations of those services provided by the protocol A that are not present in the protocol B.

By properly arranging the protocol and complement protocol functions in the end nodes 30 and 40, and the protocol converter 50, the gateway system 1 of FIG. 2 enables users attached to the network 10 to utilize all the services, or a super-set of the services, of the protocols A and B when communicating with the network 20. Likewise, users attached to the network 20 may utilize all the services of the protocols A and B when communicating with the network 10.

In operation, a service provided by both the protocols A and B is performed by a tandem combination of the exchange of corresponding service primitives between circuits $A_2$ 125 and $B_1$ 140 through the interface converter IC 135 in FIG. 2. In a similar manner, a service provided by the protocol A but not by the protocol B is performed by a tandem combination of the exchange of corresponding service primitives between circuits $A_2$ 125 and $P_{A-B,1}$ 145 through the interface converter IC 135. A service provided by the protocol B but not by the protocol A is performed by a tandem combination of the exchange of corresponding service primitives between circuits $B_1$ 140 and $P_{B-A,2}$ 130 through the interface converter IC 135.

Accordingly, the interface converter IC 135 identifies the service process that is attempting to communicate through the protocol converter 50. The interface converter IC 135 then routes the respective service primitives of that service between the appropriate circuits in the protocol converter 50. A suitable circuit for performing the operations of the interface converter IC 135 is a microprocessor or microcontroller connected to memory containing a mapping table for corresponding service primitives. An ASIC or PLA possessing the required routing capabilities may also be employed as the interface converter IC 135.

By utilizing the MUX-DEMUXs 110, 120, 150 and 160, the operations of the circuits $A_1$ 100 and $P_{B-A,1}$ 105, $A_2$ 125 and $P_{B-A,2}$ 130, $B_1$ 140 and $P_{A-B,1}$ 145, and $B_2$ 165 and $P_{A-B,2}$ 170, may be performed in parallel. One suitable technique for ensuring that messages will be exchanged only between protocol circuits, such as circuits $A_1$ 100 and $A_2$ 125, and between complement protocol circuits, such as circuits $P_{B-A,1}$ 105 and $P_{B-A,2}$ 130, is to use tags, such as a 1 or 2, to denote whether the message transmitted over the communications channel is from a respective protocol or complement protocol circuit. In an alternative embodiment, the MUX-DEMUXs 110, 120, 150 and 160 may be omitted if the corresponding protocol and complement protocol circuits are directly connected to one another.

The protocol circuit $A_1$ 100 and the complement protocol circuit $P_{B-A,1}$ 105, as well as the MUX-DEMUX 110 in the end node 30 may be arranged as separate or combined circuits. Further, the separate or combined circuits may be conventional microprocessors, ASICs or PLAs. The circuits of the protocol converter 50 and end node 40 may also be implemented as separate or various configurations of combined circuits in a similar manner.

FSMs characterizing the service operations provided to the users by the protocols A and B will be referred to by the symbols $S_A$ and $S_B$, respectively. The input-output operations depicted by the FSMs $S_A$ and $S_B$ are the service primitives of the protocols A and B, respectively. The set of input-output operations of the circuits $A_1$ 100 and $A_2$ 125 with their respective local user or upper-levels will be referred as $IA_1$ and $IA_2$, respectively. An example of this type of input-output operation includes !deliver (data) where a service primitive delivery is used to deliver a message data. In a similar manner, the set of input-output operations of the circuits $B_1$ 140 and $B_2$ 165 with their respective local users or upper-levels will be referred to as $IB_1$ and $IB_2$, respectively.

For exemplary purposes, suppose the services provided by the protocols A and B are both data transfer protocols. In operation, the circuit $A_1$ 100 may be given a service primitive for establishing a connection. In response, the circuit $A_1$ 100 would generate a corresponding output operation to the circuit $A_2$ 125. The circuit $A_2$ 125 would generate a service primitive indicating to its local user, the interface converter IC 135, that a remote user to the circuit $A_1$ 100 wishes to establish a connection. Upon receiving this service primitive, the interface converter IC 135 would generate an input service primitive for the protocol B indicating that a local user, the circuit $A_2$ 125, wants to establish a connection.

Accordingly, the interface converter IC 135 would operate to cause the circuit $B_1$ 140 to be the local user of the circuit $A_2$ 125 by routing the output service primitives of the circuit $A_2$ 125 to the input service primitives of the circuit $B_1$ 140. The circuit $B_1$ 140 would then generate a corresponding input operation to its local user, the circuit $B_2$ 165 which provides communication with the network 20. Thus, a connection may be made by a user on the network 10 to the network 20 through the gateway system 1.

In the reverse direction, the output service primitives from the circuit $B_1$ 140 are provided to the input service primitives of the circuit $A_2$ 125 by the interface converter IC 135. However, since the networks protocols 10 and 20 are different, the input service primitives for the circuit $A_2$ 125 may not have a one-to-one correspondence with the output service primitives of the circuit $B_1$ 140. Therefore, a mapping or translation between the service primitives or input-output operations $IA_2$ and those of $IB_1$ must be implemented in the interface converter IC 135.

In most cases, this translation may be a direct mapping between two corresponding operation elements of the protocols. However, In other cases, the mapping may be more complex. For instance, if two output service primitives x and y from the circuit $A_2$ 125 are equivalent to a single input service primitive z for the circuit $B_1$ 140, then the interface converter IC 135 must generate the output service primitive z upon receipt of either an input service primitive x or y. Particular service primitives of one protocol may perform functions that are not performed by any combination of service primitives of the corresponding protocol. The service primitives provided by these unmatched services are performed by the complement protocols $P_{A-B}$ and $P_{B-A}$ implemented in the circuits $P_{A-B,1}$ 145 and $P_{A-B,2}$ 170, and $P_{B-A,1}$ 105 and $P_{B-A,2}$ 130, respectively.

Figure 3:
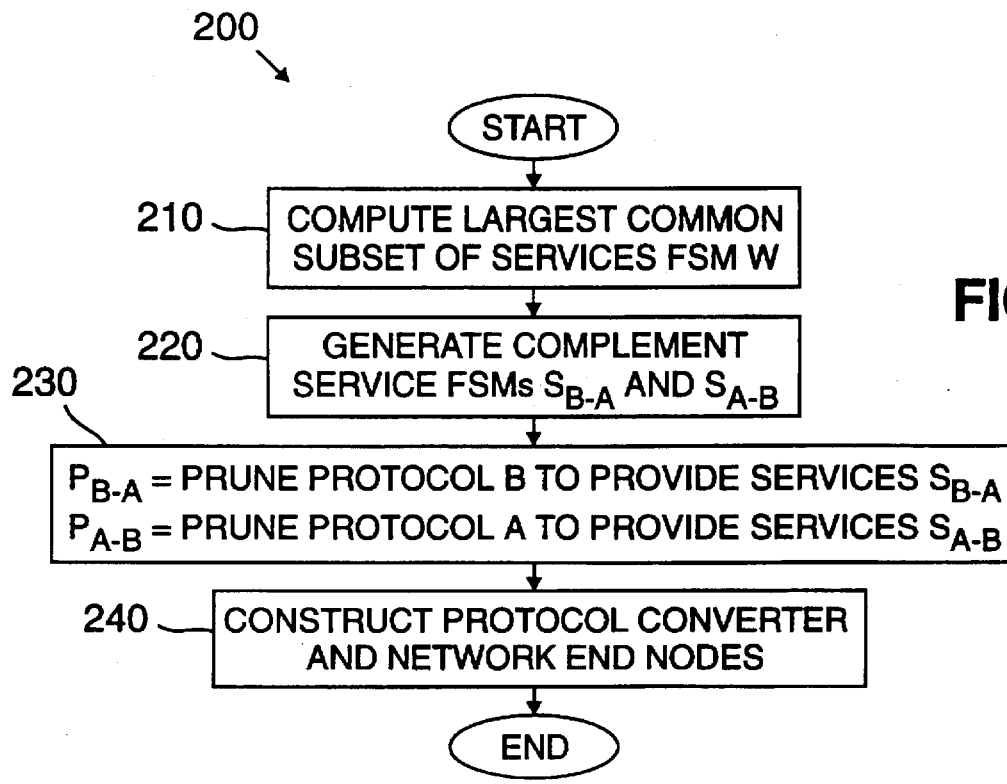
FIG. 3 is a flow diagram of the method for generating the gateway system of FIGS. 1 and 2.

One suitable method 200 for generating the gateway system 1 and corresponding complement protocols $P_{A-B}$ and $P_{B-A}$ is illustrated in FIG. 3. Referring to FIG. 3, a FSM W representing the largest common subset of services of the protocols A and B is computed in step 210. One method for computing the FSM W is to compute the expression $W=S_A'\#IC\#S_B'$, where $S_A'$ and $S_B'$ are collections of FSMs that are pruned versions of the FSMs $S_A$ and $S_B$, respectively. The pruned FSMs $S_A'$ and $S_B'$ are formed by removing the edges of the FSMs $S_A$ and $S_B$ for which there are no corresponding service primitives provided by the other service FSM $S_B$ and $S_A$, respectively. The resulting FSM W may be reduced while maintaining its operational equivalence according to a method described in P. C. Kanellakis and S. A. Smolka, "CCS Expressions, Finite State Processes, and Three Problems of Equivalence," *Information and Computation*, Vol. 86, pp. 43–68 (1990), which is incorporated by reference herein.

Complement service FSMs $S_{B-A}$ and $S_{A-B}$ specifying service primitive operations for the complement protocols $P_{B-A}$ and $P_{A-B}$ are then generated in step 220. One method for generating the complement service FSMs $S_{B-A}$ and $S_{A-B}$ is to prune the service FSMs $S_B$ and $S_A$ with respect to the common services subset FSM W. According to this method, the complement service FSM $S_{B-A}$ is generated by removing the edges of the service FSM $S_B$ that correspond to present edges in the common subset FSM W.

After generation of the complement service FSMs $S_{B-A}$ and $S_{A-B}$ in step 220, the method 200 proceeds to step 230. In step 230, the complement protocol FSMs $P_{B-A}$ and $P_{A-B}$ are generated by pruning the set of protocol FSMs characterizing the protocols B and A, respectively, to provide only those services of the complement service FSMs $S_{B-A}$ and $S_{A-B}$. One suitable technique for pruning the FSMs representing the protocols A and B is described in greater detail below with reference to FIG. 4.

The protocol converter 50 and network end nodes 30 and 40 are then constructed in step 240 according to the manner shown in FIG. 2. The protocol converter 50 and network end nodes 30 and 40 may each be comprised of at least one processor, such as a microprocessor, ASIC or PLA, to provide the operations of the corresponding interconnection of protocol and complement protocol FSMs in the circuits illustrated in FIG. 2. Methods for implementing FSMs in processors are well known in the art.

Figure 4:
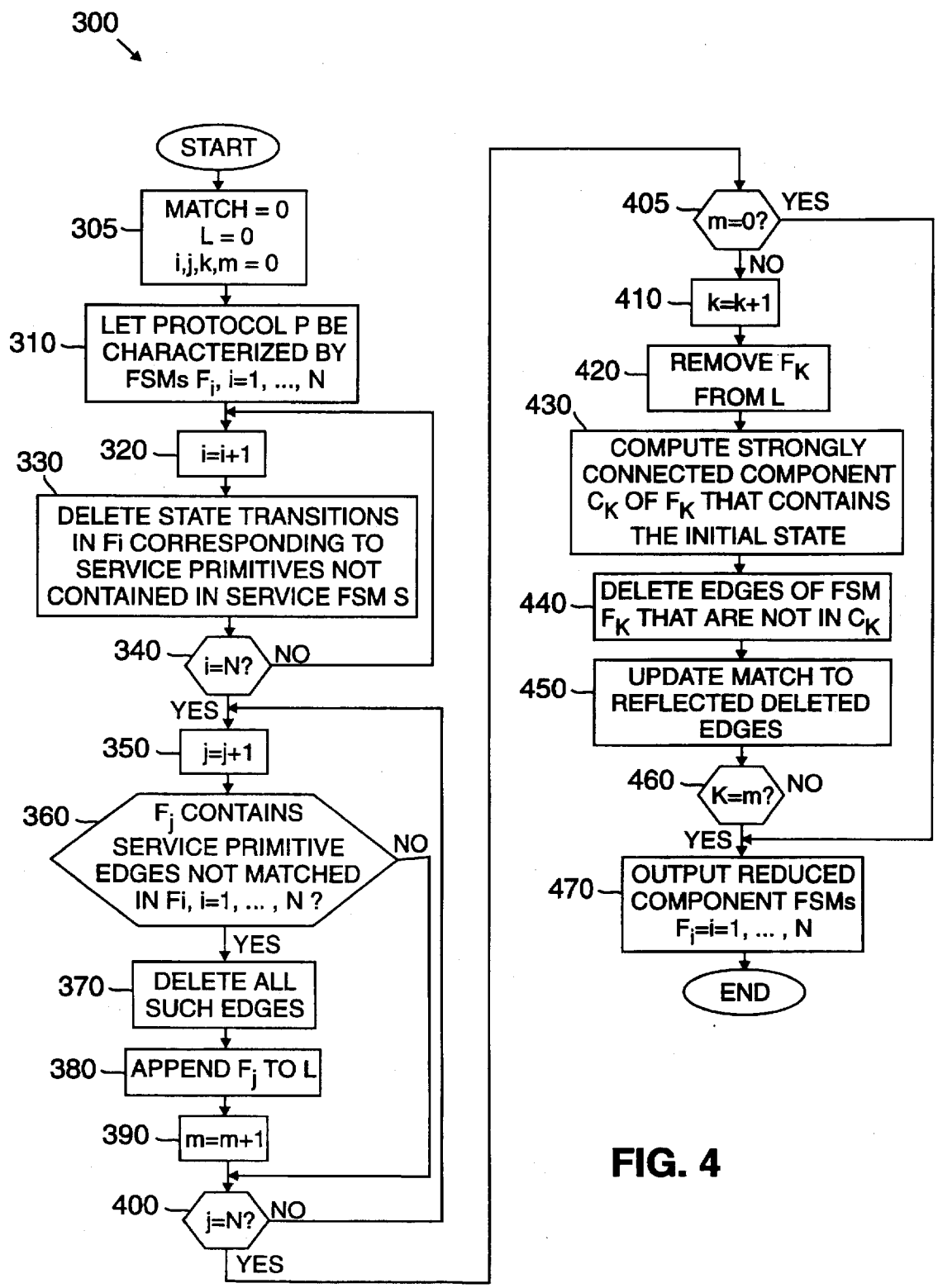
FIG. 4 is a flow diagram of a method for priming a protocol to generate a complement protocol for use in the method of FIG. 3.

FIG. 4 depicts a suitable method 300 for pruning the protocol FSMs to generate the complement protocol FSMs $P_{B-A}$ and $P_{A-B}$ in step 230 of FIG. 3. The steps of the method 300 of FIG. 4 may be grouped as follows: those edges that are labeled with service primitives other than that found in the corresponding service FSM S are deleted in the sequence of steps 320–340; those edges of the protocol FSMs that have no matching service primitives after the first sequence of steps 320–340 are deleted in steps 350–400; and in steps 405–460, the method 300 computes and retains the strongly connected FSM components that start with the initial state, and discards the rest of the machine.

In FIG. 4, a data structure MATCH, a FSM list L and counter variables i, j, k, m are initialized to zero in step 305.

Then, in step 310, the operations of a protocol P, such as protocol A used on the network 10 of FIG. 1, are characterized by a set of FSMs $F_i$, i=1, ..., N, where the value N is the total number of FSMs in the set. The counter i is then incremented in step 320. In step 330, those state transitions in the FSM $F_i$ that do not correspond to the service primitives utilized by the corresponding protocol service FSM S are deleted. If the protocol A of network 10 were used as the protocol P in the method 300, then the service FSM $S_A$ will be used as the service FSM S in the method 300.

The counter i is then compared with the total number of FSMs N in step 340. If the counter i does not equal the total number of machines N, the method 300 repeats steps 320 and 330 to delete or prune state transitions having unmatched service primitives in the next FSM $F_i$ of the set. However, if the counter i is equal to the total number of machines N, the method 300 proceeds to step 350 where the counter j is incremented.

After performing the step 350, the FSM $F_j$ is evaluated in step 360 to determine if it contains edges corresponding to services primitives that are not matched by counterpart service primitives in any other FSM of the set of FSMs F. An edge representing a service primitive may be unmatched due to deletion of their corresponding edges in step 330. For example, if an edge of the FSM $F_j$ has a label !startx for sending a service primitive startx and if the corresponding edge labeled ?startx in another FSM of the set was deleted in step 330, then the edge of the FSM $F_j$ will be unmatched. If at least one edge of the $FSM_j$ is unmatched, the method 300 performs steps 370–390. In step 370, all identified unmatched edges of the FSM $F_j$ are deleted, and in step 380, the FSM $F_j$ is appended to the list L. In step 390, the counter m which corresponds to the length of list L is incremented. After performing step 390, the method 300 proceeds to step 400. However, if in step 360, it is determined that the FSM $F_j$ contains only edges having matched service primitives, the method 300 will proceed directly to step 400.

In step 400, the counter j is tested and if it is not equal to the total number of FSMs N in the set F, the method 300 repeats steps 350 and 360 to identify if the next FSM $F_j$ contains edges having unmatched service primitives and amends the FSM $F_j$ and list L accordingly in steps 370–390. Alternatively, if the method 300 determines, in step 400, that the counter j is equal to the total number of FSMs N then all the FSMs F of the set have been processed for edges having unmatched service primitives, and the method 300 proceeds to step 405.

In step 405, the method 300 determines whether the value of the counter m is zero. If the counter m has a value of zero, no FSM in the set of FSMs F had edges deleted in step 370. As a result, the method 300 proceeds directly to step 470 which is described below. However, if the counter m is not zero in step 405, the method 300 proceeds to step 410. In step 410, the counter k is incremented, and then, in step 420, a FSM $F_k$ is removed from the list L for further processing by steps 430, 440 and 450. All FSMs contained in the corresponding list L have at least one edge deleted in step 370. The number of FSMs in the list L is represented by the counter m.

In step 430, a strongly connected component of FSM $F_k$ that contains the initial state is determined and denoted $C_k$. In a strongly connected FSM component, each node has a directed path to every other node. In step 440, those edges of the FSM $F_k$ that are not contained in $C_k$ are deleted, and in step 450, the data structure MATCH is updated to reflect those edges deleted in step 440. The FSMs characterizing protocols that do not have infinite loops for data transfers, such as connection management and call setup protocols, may be made strongly connected by adding dummy transitions.

Then, in step 460, the method 300 determines whether the counters k and l are equal. If counters k and l are found equal, the method 300 proceeds to step 470. However, if the counters k and l are not found equal, the method 300 repeats steps 410–450 to increment the counter k and determine the strongly connected components for the remaining FSMs in the list L.

In step 470, the method 300 outputs the FSMs $F_i$, $i=1, \ldots, N$, characterizing the pruned protocol P. The resulting FSMs $F_i$, $i=1, \ldots, N$, are reduced component FSMs of the original set of FSMs that characterize the protocol P and which contain the services corresponding to those of the service FSM S. Accordingly, the complement protocol FSMs $P_{B-A}$ and $P_{A-B}$ can be generated by performing the method 300 twice, a first time with the protocol P being the protocol B and with the service FSM S being the service FSM $S_{B-A}$, and a second time with the protocol P being the protocol A and with the service FSM S being the service FSM $S_{A-B}$.

One feature of the method 300 is that it generates the pruned machines utilizing a polynomial, rather than an exponential, number of computational steps. An advantage of this feature is that it permits the pruning of relatively large and complex protocols, such as conventional computer network protocols, in a relatively short computational time. Typical prior art pruning techniques require an exponential number of computational steps which is very impractical for the size and complexity of existing network protocols.

The data structure MATCH keeps track of the matching input-output services. Identical services may be associated with a counter value, which records their total number. Counter values of matching input-output services are associated with each other. When an input-output service is deleted, its associated counter value is decreased by one. When a counter value becomes zero, all the corresponding counter values are checked as follows: if a counter value μ has no matching counter value, i.e., all have become zero, then the counter value μ is changed to zero and all its associated edges in the FSM depicting that input-output service are deleted. The corresponding counter values of the counter value μ are processed similarly. This counter value updating is done iteratively until no changes have to be made to the involved counter values.

The total cost in the number of computations to initialize and to update the data structure MATCH is $$o\left(\sum_{i=1}^{k} m_i\right),$$

where $m_i$ is the number of edges of $F_i$ and where k is the number of FSMs in the set. A k-bit vector may be used to record whether the FSM $F_i$ is in the list L. In one particular vector format, if the FSM $F_i$ is in the list L, then the i-th bit of the vector is 1, otherwise it is 0. To update the vector and to check whether the FSM $F_i$ is in the list L takes a constant time. Whenever a component FSM $F_i$ is appended to the list L, at least one edge has been removed. Then, when the component FSM $F_i$ is removed from the list L, the strongly connected component is constructed that contains the initial state. It takes time $0(m_i)$ to compute the strongly connected component of a FSM $F_i$, using a depth-first search. Since an FSM $F_i$ can be removed from the list L only after it has been appended to the list L, then the total computational cost is $$o\left(\sum_{i=1}^{k} d_i m_i\right),$$

where $d_i$ is the number of edges deleted from the FSM $F_i$.

A synthesis of an exemplary gateway system 1 using the method 200 of FIG. 3 is described with respect to FIGS. 5–29. The two network protocols that are to be connected by the gateway system 1 in the example are a half-duplex alternating bit protocol ("HABP") and a full-duplex alternating bit protocol ("FABP"). The HABP transports data messages from a transmitter user process to a receiver process over a lossy communication channel. No data message is transported in the reverse direction for the HABP. Conversely, the FABP operates in a manner such that two remote processes are able to exchange data messages.

A general organization 500 of component FSMs which characterize a protocol is illustrated in FIG. 5. In FIG. 5, the arrangement consists of end entities $D_1$ 510 and $D_2$ 520 which communicate with one another over communication channels $C_{A12}$ 530 and $C_{A21}$ 540. Each end entity $D_1$ 510 and $D_2$ 520 operates according to a respective group of the FSMs in the corresponding FSM set characterizing the protocol. The operation of the HABP may be characterized using five FSMs arranged according to the organization 500 of FIG. 5 as follows: a data transmitter machine Htrans shown in FIG. 6, which corresponds to the end entity $D_1$ 510 of FIG. 5, and which retransmits data received from a local user; a data receiver machine Hrec, shown in FIG. 7, which corresponds to the end entity $D_2$ 520, and receives the data retransmitted by the FSM Htrans; a forward communication channel machine $C_{H12}$, shown in FIG. 8, for transporting data messages from the FSMs Htrans to Hrec of FIGS. 6 and 7; a reverse communication channel machine $C_{H21}$, shown in FIG. 9, for transporting acknowledgement signals ack0 or ack1 confirming receipt of the data message; and a timer machine Timer shown in FIG. 10 which is a satellite FSM of the data transmitter machine Htrans and should also be contained in the end entity $D_1$ 510 of FIG. 5. Once started, the timer machine Timer of FIG. 10 will wait a predetermined time period and generate a time out signal timeout to the transmitter machine Htrans of FIG. 6, unless during that time period it receives a message cancel from the transmitter machine Htrans.

Figure 11:
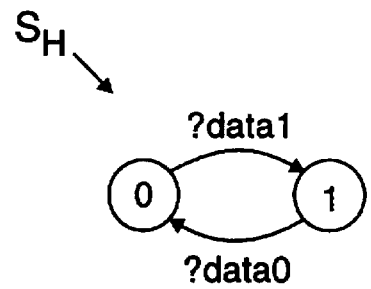
FIG. 11 is a service FSM for the HABP.

Further, a service FSM $S_H$ for the HABP is shown in FIG. 11. In FIG. 11, the service FSM $S_H$ consists of two states, 0 and 1. The FSM $S_H$ depicts the data transfer operation of the HABP. An edge labeled ?dataI denotes an input operation whereby the HABP receives a data message from the transmitter user process. A second edge labeled with !dataO represents an output operation whereby the HABP sends a data message to the receiver user process. FIG. 12 shows the five component HABP FSMs arranged according to the organization 500 of FIG. 5. Similar components in FIGS. 5 and 12 are like numbered for clarity, for example, the end entity 510.

In operation, the HABP, as represented by the FSMs Htrans, Timer, $C_{H12}$, $C_{H21}$ and Hrec of FIGS. 6–10 and service FSM $S_H$ of FIG. 11, starts with the transmitter function characterized by the FSM Htrans receiving a data message from a user using the input operation ?dataI. The transmitter function FSM Htrans then sends the data message with a sequence number of either 0 or 1 to the receiver function, characterized by FSM Hrec, over the channel $C_{H12}$. The transmitter function FSM Htrans alternates the sequence numbers between 0 and 1 for each consecutive data message in order for the receiver function characterized by the FSM Hrec to identify whether a data message has been lost.

When the transmitter function FSM Htrans transmits the data message, it also starts a local timer operation characterized by the FSM Timer, and waits for the proper acknowledgement signal ack0 or ack1 over the channel characterized by the FSM $C_{H21}$. Upon receiving the proper acknowledgement signal, the transmitter function cancels the timer by sending a message cancel. However, if no acknowledgement signal is received before the timer FSM Timer generates a signal timeout, the data message is retransmitted to the receiver FSM Hrec.

Upon receipt of a data message, the receiver function FSM Hrec determines whether it contains the proper sequence number and transmits the data message to the local user using the output operation !dataO of the service FSM $S_H$. The receiver function also sends the acknowledgement signal with a proper sequence number over the communications channel $C_{H21}$ back to the transmitter function FSM Htrans.

Figure 13:
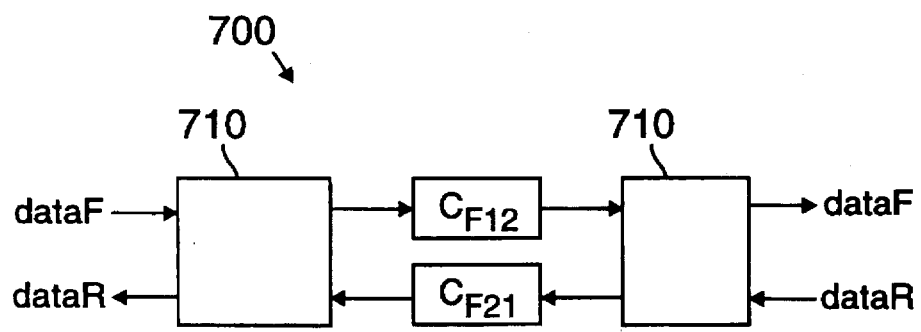
FIG. 13 is a block diagram of an arrangement of component FSMs characterizing a full-duplex alternating bit protocol (FABP) which may be implemented in one of the networks of FIG. 1.
Figure 14:
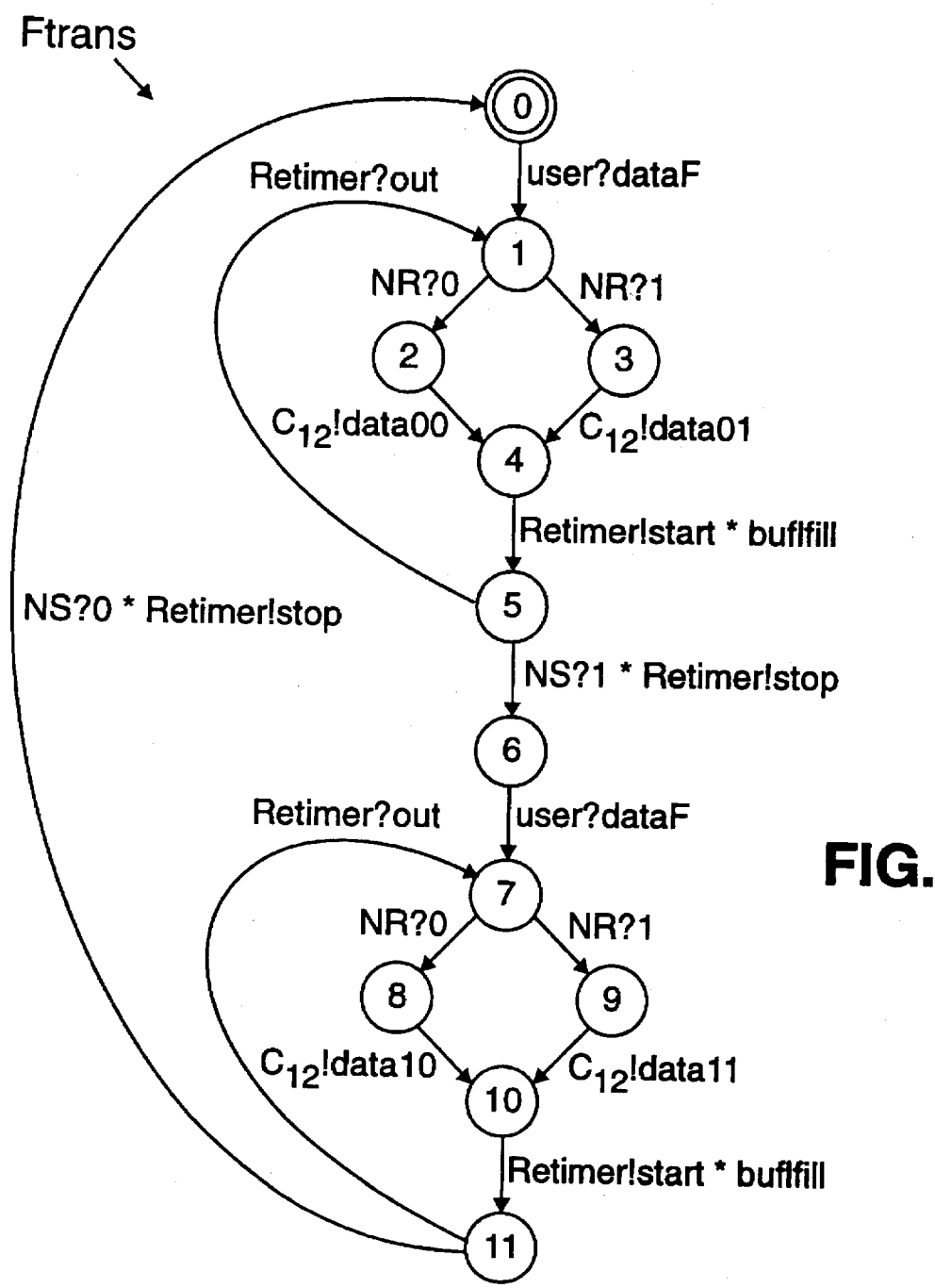
FIG. 14 is a transmitter FSM for use in the FABP.

FSMs characterizing the operation of the FABP may also be organized according the system 500 of FIG. 5 as shown by the arrangement 700 in FIG. 13. In FIG. 13, the FABP is modeled using two identical protocol entities 710 communicating with one another by two communication channels $C_{F12}$ and $C_{F21}$. For the FABP, each one of the protocol entities may consist of seven FSMs. The seven FSMS are: a transmitter function FSM Ftrans, shown in FIG. 14, for retransmitting outgoing data messages received from a user; a retransmission timer FSM Retimer, shown in FIG. 15, which operates in a similar manner to the FSM Timer of FIG. 10; a receiver function FSM Frec, shown in FIG. 16, which receives incoming data messages and acknowledgement signals; a sequence number storage FSM NR, shown in FIG. 17, for storing the next sequence number of expected message to be received by the receiver function FSM Frec; a sequence number storage FSM NS, shown in FIG. 18, for storing the sequence number of the next expected message to be sent by the transmitter function FSM Ftrans; an explicit acknowledgement FSM Buf, shown in FIG. 19, for sending acknowledgement signals confirming receipt of a data message; and an acknowledgment timer FSM Atimer, shown in FIG. 20, for performing the timing operations for the FSM Buf.

Figure 21:
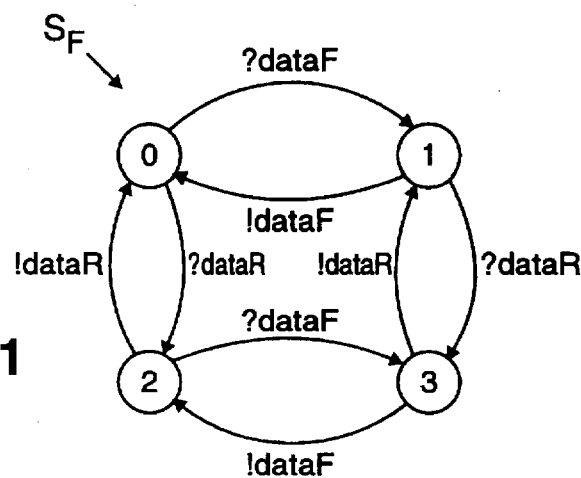
FIG. 21 is a service FSM for the FABP.
Figure 23:
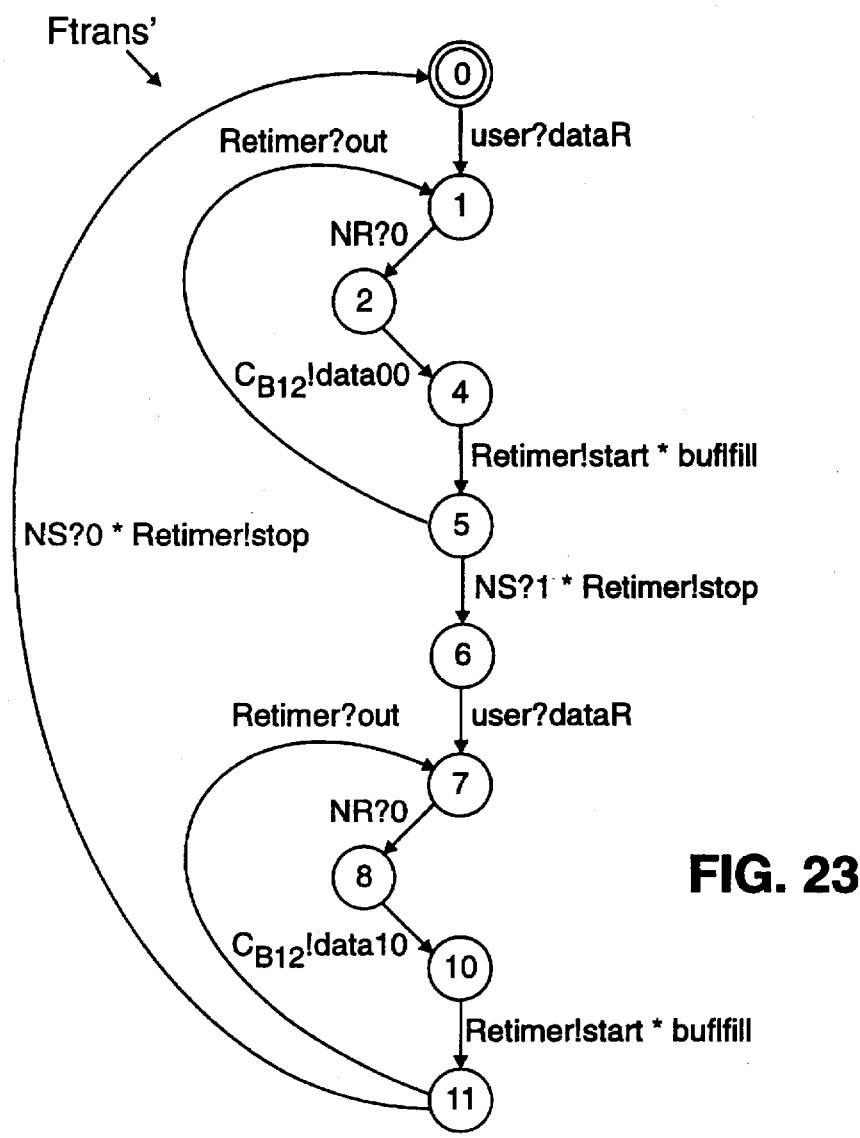
FIG. 23 is a pruned transmitter FSM generated according to the method of FIG. 4 based on the FSM of FIG. 14.

A service FSM $S_F$ for the FABP is shown in FIG. 21. In FIG. 21, the service FSM $S_F$ consists of four states 0, 1, 2 and 3. The FSM $S_F$ depicts the data transfer operation of the FABP. During operation, the service FSM $S_F$ receives a data message from one network user process by traversing edges that activate an input operation ?dataF, and delivers it to the other user process by traversing the edges that activate an output operation !dataF.

Each end entity 710 of the FABP in FIG. 13 employs two methods of acknowledging receipt of data messages with the appropriate sequence number. In a first method, the receiver function FSM Frec uses the FSM Buf of FIG. 19 and associated FSM Atimer of FIG. 20 to generate acknowledgement signals ack0 and ack1. In addition, a second method of acknowledging receipt of a data message is to piggy-back acknowledgement signals on return data messages.

A data message has a structure of data[x][y] where data is the information that is sent. The parameter x is the sequence number of the message and may be either a 0 or 1. The parameter y is the piggyback acknowledgement, and may have a value of either a 0 or 1. The parameter y performs the same operation as the transmission of an acknowledgement signal ack0 or ack1 for a recently received data message. In operation, when a data message is received, the operation characterized by the FSM Frec starts the operation represented by the FSM Buf which activates the process Atimer. If a data message is not sent out by the end entity 710 of FIG. 13 before the timer Atimer expires, then the proper acknowledgement signal ack0 or ack1 is transmitted. The composition of these seven FABP protocol FSMs in FIGS. 14–20 represent a total of 3,192 states and 14,026 edges.

A gateway system generated according to the method 200 of FIG. 3 for connecting a HABP network and a FABP network would provide full duplex communication through the gateway between users on either network. For ease of illustration, the HABP will alternatively be referred to as the protocol A and the FABP as the protocol B in the following description. In generating such a gateway system according to step 210 of the method 200 of FIG. 3, a FSM W is computed corresponding to the largest common subset of services provided by the service FSM $S_A$, or the FSM $S_H$ in this example, and the service FSM $S_B$, or the FSM $S_F$ in this example. Since the service operations of the service FSM $S_H$ of FIG. 11 are all included in the service FSM $S_F$, the resulting FSM W is equal to the service FSM $S_H$.

Figure 22:
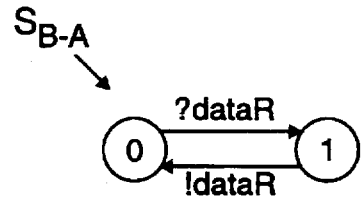
FIG. 22 is a complement service generated according to the method of FIG. 3 based on the service FSMS of FIGS. 11 and 12.

Then, according to step 220, complement service FSMs $S_{A-B}$ and $S_{B-A}$ are computed. The complement service FSMs $S_{A-B}$ and $S_{B-A}$ may be computed by removing those services provided by the FSM W from the service FSMs $S_{A-B}$ and $S_{B-A}$, respectively. Accordingly, the complement service protocol FSM $S_{A-B}$ is null because all the services provided by the FSM W are provided in the service protocol FSM $S_H$. However, the resulting complement service protocol $S_{B-A}$ provides those services of the FSM $S_F$ that transfer data in the reverse direction, or the direction not provided by the HABP. The resulting complement service FSM $S_{B-A}$ is shown in FIG. 22.

The method 200 then proceeds to step 230 where the protocols A and B are pruned to form the complement protocol FSMs $P_{A-B}$ and $P_{B-A}$. Since the complement service protocol FSM $S_{A-B}$ is null the corresponding complement protocol FSM $P_{A-B}$ is also null. However, pruning the protocol B, represented by the collection of FSMs of FIGS. 14–20, to provide those services of the complement service protocol $S_{B-A}$ yields the FSMs illustrated in FIGS. 23–28. In FIGS. 23–28, the pruned FSMs are labeled by adding a prime to the name of the corresponding FSMs of FIGS. 14–20. For example, the transmitter FSM Ftrans of FIG. 14 corresponds with the pruned transmitter FSM Ftrans' of FIG. 23.

Figure 15:
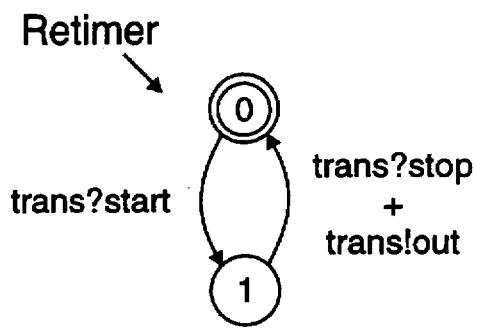
FIG. 15 is a data retransmission timer FSM associated with the FSM of FIG. 14.
Figure 17:
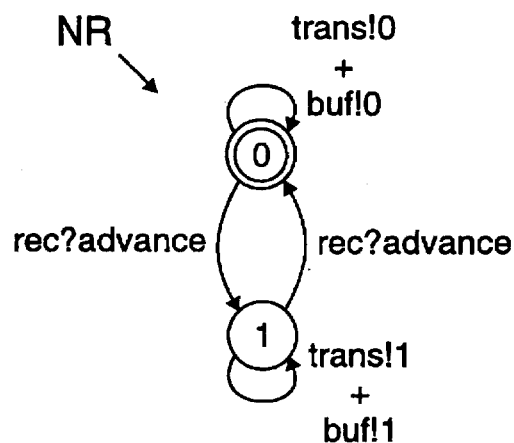
FIG. 17 is a sequence number storage FSM associated with the receiver FSM of FIG. 16.
Figure 18:
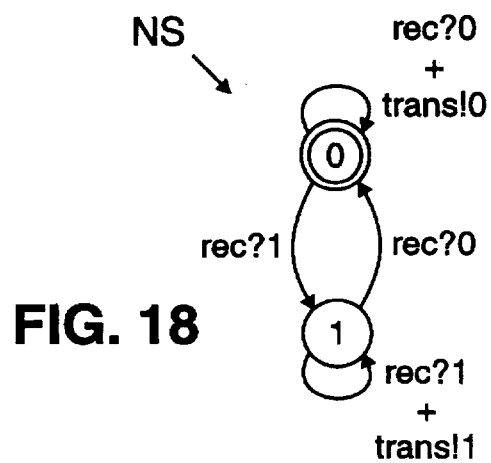
FIG. 18 is a sequence number storage FSM associated with the transmitter FSM of FIG. 14.
Figure 16:
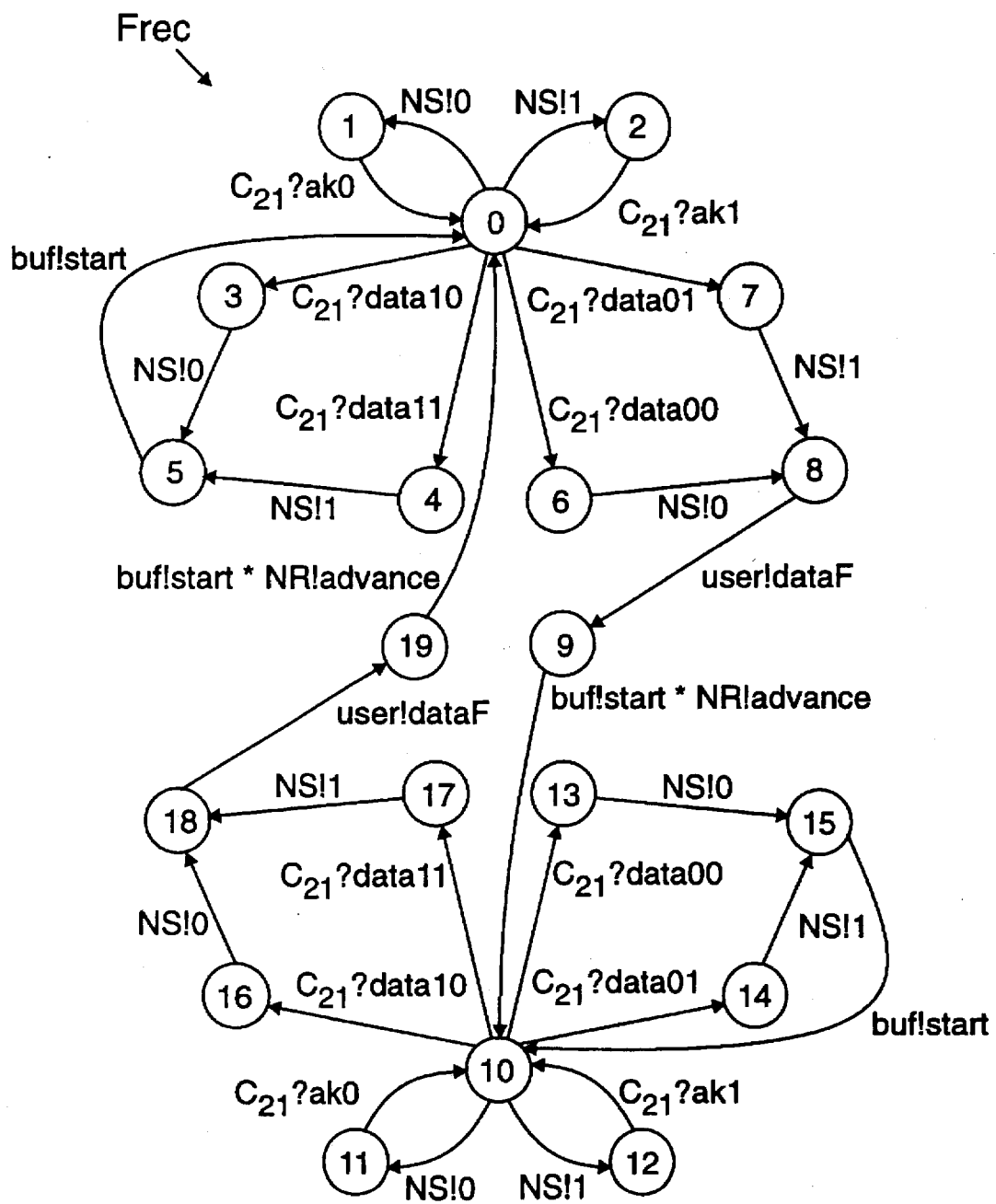
FIG. 16 is a receiver FSM for use in the FABP.
Figure 19:
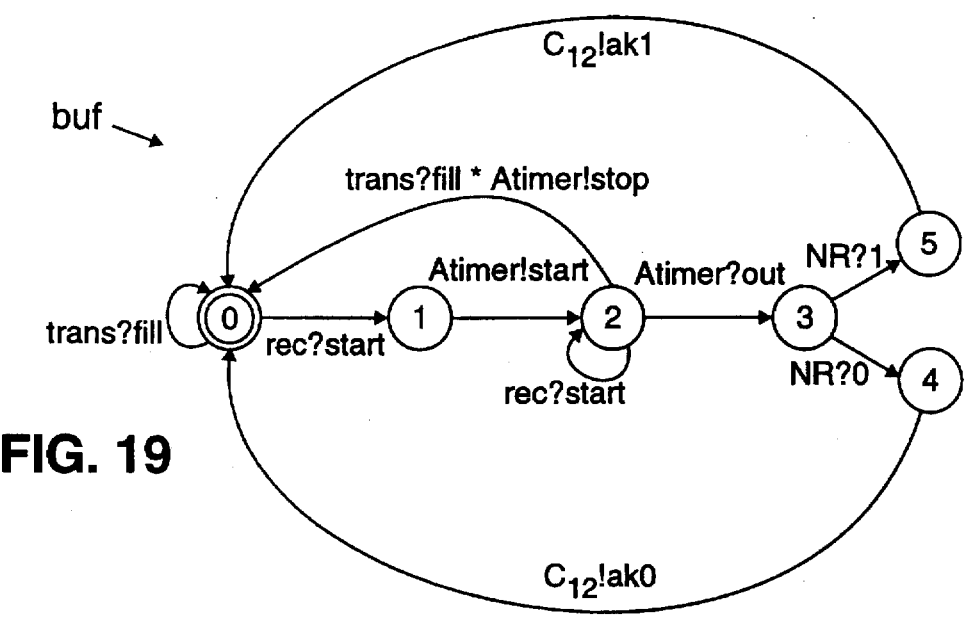
FIG. 19 is a FSM for generating an acknowledgement signal associated with the receiver FSM of FIG. 16.
Figure 20:
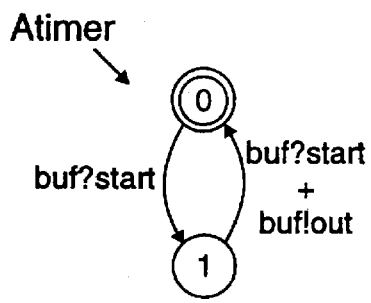
FIG. 20 is an acknowledgement timer associated with the FSM of FIG. 19.
Figure 24:
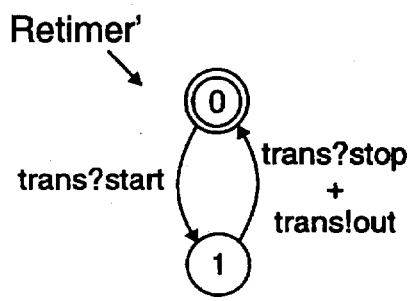
FIG. 24 is a pruned data retransmission timer FSM generated according to the method of FIG. 4 based on the FSM of FIG. 15.
Figure 25:
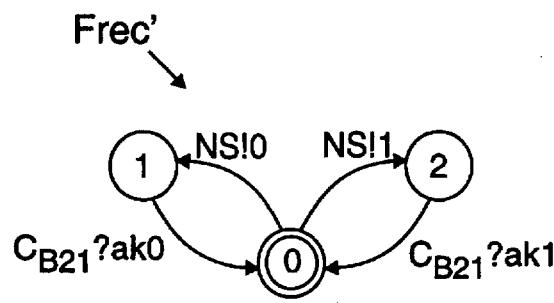
FIG. 25 is a pruned receiver FSM generated according to the method of FIG. 4 based on the FSM of FIG. 16.
Figure 26:
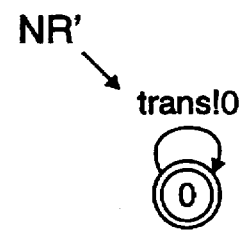
FIG. 26 is a pruned sequence number storage FSM generated according to the method of FIG. 4 based on the FSM of FIG. 17.
Figure 27:
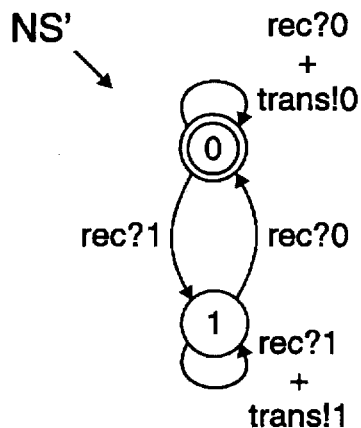
FIG. 27 is a pruned sequence number storage FSM generated according to the method of FIG. 4 based on the FSM of FIG. 18.
Figure 28:
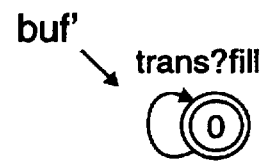
FIG. 28 is a pruned FSM for generating an acknowledgement signal generated according to the method of FIG. 4 based on the FSM of FIG. 19.

During the pruning step, the FSM Atimer of FIG. 20 is pruned out of existence, while the sequence number storage FSM NS of FIG. 18 and retransmission timer FSM Retimer of FIG. 15 remain fully intact in forming the pruned counterparts in FIGS. 27 and 24. The pruned FSMs for the complement protocol $P_{B-A}$ in FIGS. 23–28 provide only those data transfer functions in the reverse direction. The last step 240 of the method 200 is to construct the protocol converter 50 and network end nodes 30 and 40 according to the generated complement protocols in the manner shown in FIG. 2.

Figure 29:
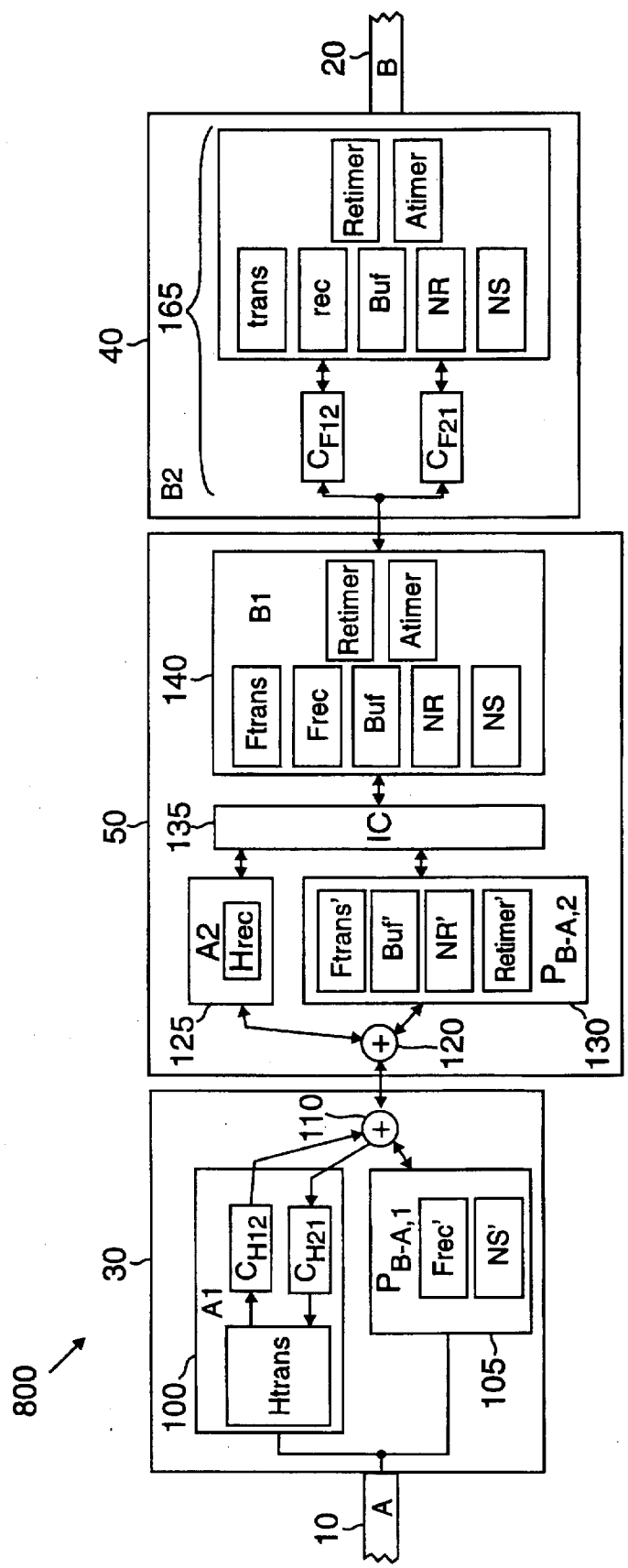
FIG. 29 is a block diagram of a gateway system between a HABP network and a FABP network employing the FSMs of FIGS. 14–28 arranged according to the present invention.

A gateway system 800 connecting a HABP network 10 and a FABP network 20 employing circuits according to the FSMs of FIGS. 23–28 is shown in FIG. 29. The circuits in FIG. 29 corresponding to those of FIG. 2 are like numbered for clarity, for example, the complement protocol circuit 105. In addition, those circuits in FIG. 29 which perform the operations of the FSMs illustrated in FIGS. 14–28 are like named for ease of illustration. For example, the circuit Htrans in FIG. 29 and the corresponding transmitter function FSM Htrans in FIG. 14.

In FIG. 29, an end node 30 of the network 10 contains the circuits $A_1$ 100 and $P_{B-A,1}$ 105. The protocol circuit $A_1$ 100 performs the data message transmission operation of the HABP of the network 10. The circuit $A_1$ 100 contains the circuit Htrans and the half duplex communication channels $C_{H21}$ and $C_{H12}$ which operate according to the FSMs of FIGS. 8 and 9, respectively. The complement protocol circuit $P_{B-A,1}$ 105 consists of circuits Frec' and NS' for receiving data. The circuits $A_1$ 100 and $P_{B-A,1}$ 105 transmit and receive messages from a protocol converter 50 through the MUX-DEMUXs 110 and 120 over the communication channel 60.

Figure 7:
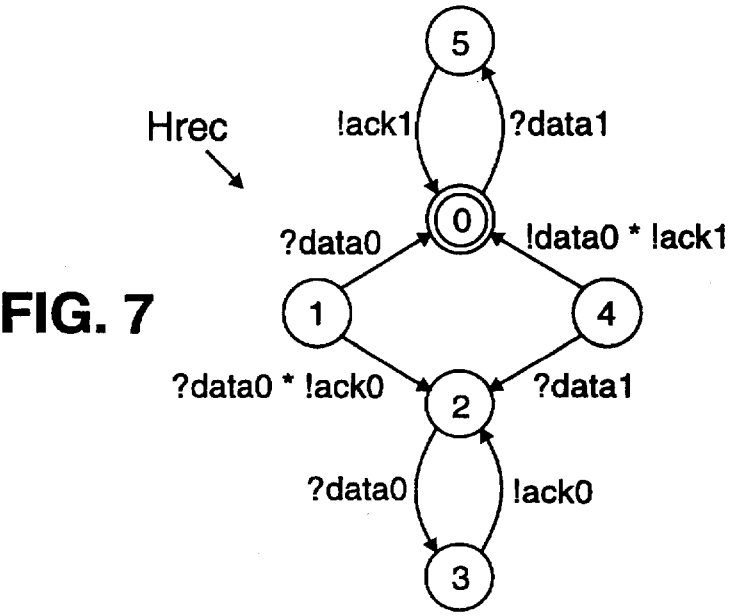
FIG. 7 is a receiver FSM for use in the HABP.

The protocol converter 50 of FIG. 29 includes the circuit $A_2$ 125 for performing the operations of the HABP receiver FSM Hrec of FIG. 7. The protocol converter 50 also consists of the interface complement protocol circuit $P_{B-A,2}$ 130, the interface converter IC 135, and the interface protocol circuit $B_1$ 140 corresponding to the protocol end entity 710 in FIG. 13. The circuit $B_1$ 140 performs the operations of the seven FABP protocol FSMs shown in FIGS. 14–20. The complement protocol circuits $P_{B-A,1}$ 105 and $P_{B-A,2}$ 130 in FIG. 29 operate in the manner specified by the complement protocol FSMs shown in FIGS. 23–28. The complement protocol circuits operations Frec' and NS' for retransmitting data to a destination user and are, therefore, disposed in the circuit $P_{B-A,1}$ 105. Accordingly, the complement protocol circuit operations Ftrans', Buf', NR' and Retimer' which receive the data from a local user have been disposed in the circuit $P_{B-A,2}$ 130.

The circuit $B_1$ 140 of the protocol converter 50 is directly connected to a second network end node 40. The network end node 40 consists of the protocol circuit $B_2$ 165 which performs the identical operation of the circuit $B_1$ 140 in the protocol converter 50. Full-duplex communication between the circuits 140 and 165 occur over communication channels $C_{F12}$ and $C_{F21}$. The circuit $B_2$ 165 is also connected to the network 20.

The complement protocol circuits $P_{A-B,1}$ 145 and $P_{A-B,2}$ 170 and associated MUX-DEMUXs 150 and 160 of FIG. 2 are not used in the system 800 of FIG. 29 because no such circuits are required. Since the complement protocol FSM $P_{A-B}$ and complement service FSM $S_{A-B}$ are null, the corresponding complement protocol circuits are not required. Such circuits are not necessary in this example because there are no operations performed by the protocol HABP of network 10 that are not performed by the protocol FABP of the network 20. The circuits $B_1$ 140 and $B_2$ 165 perform identical operations in FIG. 29 because of the mirror-like processes of a full-duplex protocol. However, these circuits may perform different operations in other gateway systems 1 depending upon the protocols implemented on the networks 10 and 20. In transmitting information from a network 10 user to a user process on the network 20, the information is transmitted through the circuit $A_1$ 100 in the network end node 30 to the circuit $A_2$ 125 in FIG. 29. The information from the circuit $A_2$ 125 is then directed to the circuit $B_1$ 140 by the interface converter IC 135. The information is then transmitted by the circuit $B_1$ 140 to the circuit $B_2$ 165 in the end node 40 where it is retransmitted to the user process on the network 20.

In the reverse direction, network 20 users may transmit data to network 10 users in FIG. 29, despite the fact that only an HABP is implemented in the network 10. In transmitting information from a network 20 user process to a network 10 user process, the information is transmitted through the circuit $B_2$ 165 in the network end node 40 to the circuit $B_1$ 140 in the protocol converter 50. The circuit $B_1$ 140 provides the information to the interface converter IC 135 which is configured to transmit the information to the circuit $P_{B-A,2}$ 130. Then, the information is transmitted by the circuit $P_{B-A,2}$ 130 to the circuit $P_{B-A,1}$ 105 in the network end node 30. The circuit $P_{B-A,1}$ 105 possesses the capability to retransmit the information to the user process on the network 10.

Therefore, the present invention provides a relatively short and simple technique for generating a gateway between different network protocols employing complement protocols which enables users of both networks to transmit and receive information between each other using a super-set of services provided by the protocols of both networks. One advantage of providing a super-set of services is that the gateway system between the networks may appear transparent to a user of one of the networks as he will be able to utilize all the services familiar to him on that network to exchange data with the other network.

In an alternative embodiment of the gateway system 1 of FIG. 2, complement protocols and corresponding circuits may be generated for only one of the networks using the method 200 of FIG. 3. For example, the complement protocol $P_{B-A}$ and not $P_{A-B}$ would be generated for such a system. Accordingly, the circuits $P_{A-B,1}$ 145 and $P_{A-B,2}$ 170 would be eliminated from the protocol converter 50 and end node 40. Likewise, the MUX-DEMUXs 150 and 160 may be removed as no messages need be multiplexed on the communications channel 70 between the circuits $B_1$ 140 and $B_2$ 165. As a result, users on the network 10 may utilize all the services of both of the protocols A and B when transmitting or receiving information using this alternative gateway system. However, users on the network 20 would be limited to using only those services common to protocols A and B when communicating through this alternative gateway system.

Although one embodiment of a method for generating a gateway system that provides a super-set of protocol services has been described in detail above, it would be readily understood by those having ordinary skill in the art that many modifications are possible in the described embodiment without departing from the teachings of the present invention. All such modifications are intended to be encompassed by the claimed invention. For instance, a single microprocessor may be employed in the network end nodes and protocol converter to perform those operations specificized by the FSMs contained therein. Further, although the exemplary gateway system described above concerned computer networks, the present invention may be used for generating for providing gateway systems to other data and telecommunication networks.

We claim:

1. A method for generating a gateway system between first and second networks implementing corresponding first and second communication protocols which provide first and second sets of services, respectively, wherein each protocol can be represented by a set of at least one finite state machine (FSM), the method comprising the steps of:

determining a common subset of services equal to a subset of the intersection of services provided by the protocols;

determining first and second complement service FSMs for the first and second network protocols, wherein the first complement service FSM contains those services provided by the second network protocol that are not characterized in the first network protocol, and wherein a second complement service FSM contains those services provided by the first network protocol that are not characterized in the second network protocol;

pruning the set of second network protocol FSMs to provide only operations corresponding to the services performed by the first complement service FSM to generate a first set of complement network protocol FSMs;

pruning the set of first network protocol FSMs to provide only operations corresponding to the services performed by the second complement service FSM to generate a second set of complement network protocol FSMs; and constructing a gateway system based on the first and second set of protocol FSMs, the first and second set of complement protocol FSMs and an interface converter.

2. The method of claim 1, wherein each of the steps of pruning the set of protocol FSMs to generate a corresponding complement protocol FSM comprises the steps of:

deleting an edge from a first protocol service FSM corresponding to a service not characterized in a second protocol service FSM, and deleting an edge from the second protocol service FSM corresponding to a service not characterized in the first service FSM to form a first set of pruned FSMs;

deleting an edge from the first set of pruned FSMs which represent unmatched service primitives to form a second set of pruned FSMs; and deleting an edge in the second set of pruned FSMs which are not within a strongly connected component of the corresponding second pruned FSM that contains the initial state to form a third set of pruned FSMs.

3. The method of claim 1, wherein the step of determining first and second complement protocols comprises the steps of:

pruning protocol FSMs characterizing the services provided by the protocols by removing edges in the service FSMs that correspond to services provided in the common subset of services.

4. A method for generating a gateway system between first and second networks implementing corresponding first and second communications protocols which provide first and second sets of services, respectively, wherein each protocol can be represented by a set of at least one finite state machine (FSM), the method comprising the steps of:

determining a common subset of services equal to a subset of the intersection of services provided by the protocols;

determining first and second complement service FSMs for the first and second network protocols, wherein the first complement service FSM contains those services provided by the second network protocol that are not characterized in the first network protocol, and wherein the second complement service FSM contains those services provided by the first network protocol that are not characterized in the second network protocol;

pruning the set of second network protocol FSMs to provide only operations corresponding to the services performed by the first complement service FSM to generate a first set of complement network protocol FSMs;

pruning the set of first network protocol FSMs to provide only operations corresponding to the services performed by the second complement service FSM to generate a second set of complement network protocol FSMs; and constructing a gateway system employing circuit equivalents of the first and second set of protocol FSMs, the first and second set of complement protocol FSMs and an interface converter, wherein each of the steps of pruning the set of protocol FSMs to generate a corresponding complement protocol FSM comprises the steps of:

deleting an edge from a first protocol service FSM corresponding to a service not characterized in a second protocol service FSM, and deleting an edge from the second protocol service FSM corresponding to a service not characterized in the first protocol service FSM to form a first set of pruned FSMs;

deleting an edge from the first set of pruned FSMs which represent service primitives for which there are no counterpart service primitives in the first set of pruned FSMs to form a second set of pruned FSMs; and deleting an edge in the second set of pruned FSMs which are not within a strongly connected component of the corresponding second pruned FSM that contains the initial state to form a third set of pruned FSMs.

5. A method for generating a gateway system between first and second networks implementing corresponding first and second communication protocols which provide first and second sets of services, wherein each protocol can be represented by a set of at least one finite state machine (FSM), the method comprising the steps of:

determining a common subset of services equal to a subset of the intersection of services provided by the protocols;

determining a first complement service FSM for the first network protocol, wherein the first complement service FSM contains those services provided by the second network protocol that are not characterized in the first network protocol;

pruning the set of second network protocol FSMs to provide only operations corresponding to the services performed by the first complement service FSM to generate a first set of complement network protocol FSMs;

constructing a gateway system employing circuit equivalents of the first and second set of protocol FSMs, the first set of complement protocol FSMs and an interface converter to provide all the input-output services of the first and second networks to users of the first network in communicating through the gateway system;

determining a second complement service FSM for the second network protocol, wherein the second complement service FSM contains those services provided by the first network protocol that are not provided by the second network protocol; and pruning the set of first network protocol FSMs to provide only operations corresponding to the services performed by the second complement service FSM to generate a second set of complement network protocol FSMs, wherein the step of constructing the gateway system further includes employing a circuit equivalent of the second set of complement protocol FSMs and an interface converter to provide all the input-output services of the first and second networks to users of the first and second network in communicating through the gateway system.

6. A gateway system between first and second networks, each network implementing a protocol, the gateway system comprising:

a first end node connected to the first network, the end node having a protocol circuit and a first complement protocol circuit;

a first communication channel connected to the first end node;

a second end node connected to the second network, the second end node having a protocol circuit;

a second communications channel connected to the second network end node;

a protocol converter connected to the first and second end nodes, the protocol converter having a first interface protocol circuit for communicating with the first end node protocol circuit, and a first interface complement protocol circuit for communicating with the first complement protocol circuit, the protocol converter further having a second interface protocol circuit for communicating with the second end node protocol circuit, and an interface converter connected to the first and second interface protocol circuits and first interface complement protocol circuit, wherein the interface converter translates and routes information between the first interface protocol circuit and the second interface protocol circuit, and between the first interface complement protocol circuit and the second interface protocol circuit to provide the input-output services of the first and second networks to users of the first network in communicating through the gateway system;

a second complement protocol circuit disposed in the second end node, the second complement protocol circuit being connected to the second network and the second communications channel; and a second interface complement protocol circuit disposed in the protocol converter and being connected to the interface converter and the second communications channel, wherein the interface converter routes information between the first interface protocol circuit and the interface complement protocol circuit, and the second interface protocol circuit and second interface complement protocol circuit to provide input-output services of the first and second networks in communicating through the gateway system.

7. The gateway system of claim 6, wherein the circuits in an end node are contained in a single processor.

8. The gateway system of claim 6, wherein at least two of the circuits in the protocol converter are contained in a single processor.

9. The gateway system of claim 6, wherein the signals between the first protocol circuit and the first interface protocol circuit and between the first complement protocol circuit and the first interface complement protocol circuit are multiplexed on the first communications channel.

10. The gateway system of claim 6, wherein the circuits in the second end node are contained in a single processor.

11. The gateway system of claim 6, wherein at least two of the circuits in the protocol converter are contained in a single processor.

12. The gateway system of claim 6, wherein the signals between the second protocol circuit and second complement protocol circuit and the corresponding second interface protocol circuit and the second interface complement protocol circuit are multiplexed on the second communications channel, respectively.

* * * * *